United States Patent
Jang

(10) Patent No.: US 9,733,735 B2
(45) Date of Patent: Aug. 15, 2017

(54) METHOD AND APPARATUS FOR PROVIDING ADVERTISEMENT USING TOUCH PEN

(71) Applicant: Samsung Electronics Co., Ltd., Gyeonggi-do (KR)

(72) Inventor: Youngje Jang, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 16 days.

(21) Appl. No.: 14/546,756

(22) Filed: Nov. 18, 2014

(65) Prior Publication Data

US 2015/0138119 A1  May 21, 2015

(30) Foreign Application Priority Data

Nov. 18, 2013 (KR) .................. 10-2013-0139653

(51) Int. Cl.
| | | |
|---|---|---|
| *G06F 3/038* | (2013.01) | |
| *G06F 3/0354* | (2013.01) | |
| *G06F 3/041* | (2006.01) | |
| *G06F 3/0486* | (2013.01) | |
| *G06F 3/0488* | (2013.01) | |
| *G06F 3/0484* | (2013.01) | |
| *G06Q 30/02* | (2012.01) | |

(52) U.S. Cl.
CPC .......... *G06F 3/038* (2013.01); *G06F 3/03545* (2013.01); *G06F 3/0416* (2013.01); *G06F 3/0486* (2013.01); *G06F 3/0488* (2013.01); *G06F 3/04842* (2013.01); *G06F 3/04883* (2013.01); *G06Q 30/0207* (2013.01)

(58) Field of Classification Search
CPC .... G06F 3/038; G06F 3/03545; G06F 3/0416; G06F 3/04842; G06F 3/0486; G06F 3/04883
USPC .................... 345/173, 179; 178/19.01–19.07
See application file for complete search history.

(56) References Cited

U.S. PATENT DOCUMENTS

| | | | |
|---|---|---|---|
| 2007/0050251 A1 | 3/2007 | Jain et al. | |
| 2007/0062739 A1 | 3/2007 | Philipp et al. | |
| 2010/0083191 A1* | 4/2010 | Marshall ............... | G06F 1/1626 715/863 |
| 2012/0113041 A1 | 5/2012 | Westerman | |

FOREIGN PATENT DOCUMENTS

| | | |
|---|---|---|
| KR | 10-2010-0136578 | 12/2010 |
| KR | 10-2012-0029210 | 3/2012 |

* cited by examiner

*Primary Examiner* — Stephen Sherman

(57) ABSTRACT

A method and apparatus are provided for providing advertisement in an electronic device having a touch pen. The method for providing advertisement includes sensing a touch of a banner using a touch pen, confirming whether the banner is a touch pen based banner, and operating the touch pen based banner through the touch pen if the banner is the touch pen based banner.

17 Claims, 7 Drawing Sheets

METHOD AND APPARATUS FOR PROVIDING ADVERTISEMENT USING TOUCH PEN

CROSS-REFERENCE TO RELATED APPLICATION(S) AND CLAIM OF PRIORITY

The present application is related to and claims the benefit under 35 U.S.C. §119(a) of a Korean patent application filed on Nov. 18, 2013 in the Korean Intellectual Property Office and assigned Serial No. 10-2013-0139653, the entire disclosure of which is hereby incorporated by reference.

TECHNICAL FIELD

The present disclosure relates to a method and apparatus for providing advertisement in an electronic device having a touch pen.

BACKGROUND

Recently, portable electronic devices that integrally support various user functions have been spotlighted. When using existing portable electronic devices, only simple user functions can be supported, and only simple information can be provided on small display regions. Recently, as various user functions, such as search for various kinds of information that are provided on the basis of a web, can be provided through electronic devices, display units of the electronic devices have been gradually increased to transfer visual information more effectively.

In addition, in selecting and operating content that is output on the display unit, a touch pen for easily performing various user functions has been spotlighted. As compared with a finger, the touch pen has a sharp pointed end, and thus can support more delicate selection of a predetermined region of the display unit being supported.

SUMMARY

The touch pen can support more delicate touch functions. However, the touch pen can provide a simple touch function, but fails to provide separate additional functions. That is, the existing touch pen can provide the touch function to the extent that it merely replaces the finger, and thus there is not a great necessity that a user operates a terminal especially based on a touch pen.

Alternatively, in selecting a banner that provides advertisement according to the existing method, once a touch occurs, a display screen is shifted to display the advertisement. Since this means that the current page is changed to cause inconvenience, it may impose a burden on a user.

In order to solve such inconvenience, an embodiment of the present disclosure can display an advertisement banner that performs a separate operation on the same screen in response to a touch using a touch pen. Accordingly, an embodiment of the present disclosure can solve the inconvenience that is caused by the screen change when an advertisement is provided, and extend the function of the touch pen.

To address the above-discussed deficiencies, it is a primary object to provide disclosure a method for providing advertisement includes sensing a touch of a banner using a touch pen; confirming whether the banner is a touch pen based banner; and operating the touch pen based banner through the touch pen if the banner is the touch pen based banner.

In accordance with another embodiment of the present disclosure, an apparatus for providing advertisement includes a touch pen, a touch sensor, a radio communication unit, and a control unit. The touch sensor senses an occurrence of a touch of a banner through the touch pen or other touch tools. The radio communication unit receives data of a touch pen based banner from a server. The control unit performs a banner operation through a touch of the touch pen if the touch of the touch pen based banner occurs through the touch pen.

According to the method and apparatus for providing advertisement using the touch pen according to the embodiments of the present disclosure, the advertisement banner that performs separate operation in reaction to the touch using the touch pen can be displayed. In an embodiment, according to the method and apparatus for providing advertisement using the touch pen, it becomes possible to perform display of an additional advertisement screen on the existing screen, event participation, and data download without separate screen change.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
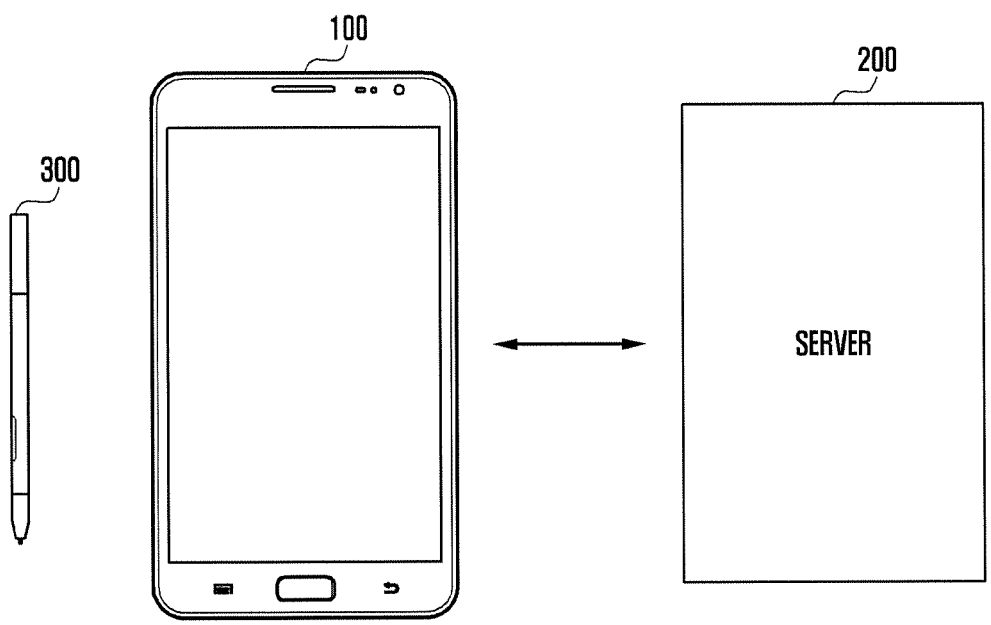
FIG. 1 illustrates a view of the configuration of an apparatus that is used when advertisement is provided according to an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, preferred embodiments of the present disclosure will be described in detail with reference to the accompanying drawings. In the accompanying drawings, the same reference numerals are used for the same constituent elements. Further, detailed description of well-known functions and structures incorporated herein may be omitted to avoid obscuring the subject matter of the present disclosure. In the following description, only portions that is necessary to understand the operation according to various embodiments of the present disclosure will be explained, and it is to be noted that explanation of other portions will be omitted such that the subject matter of the present disclosure is not scattered.

FIG. 1 illustrates a view of the configuration of an apparatus that is used when advertisement is provided according to an embodiment of the present disclosure.

First, referring to FIG. 1, when advertisement is provided according to an embodiment of the present disclosure, an electronic device 100, a server 200 that communicates with the electronic device, and a touch pen 300 that performs a touch input on the electronic device may be used. The electronic device 100 may be manufactured so as to sense a touch that occurs using a touch pen 300 and to perform radio communication with the server 200.

Figure 2:
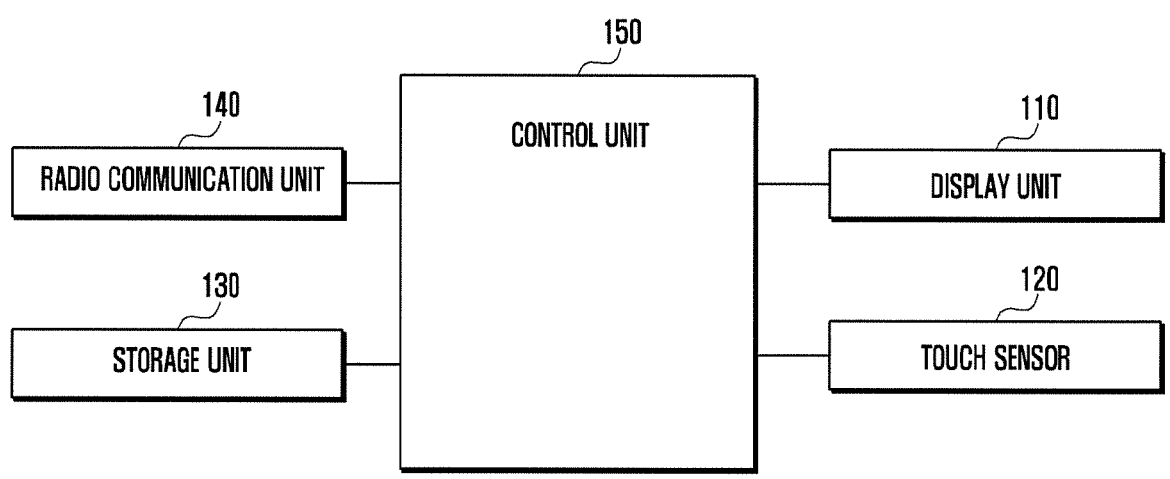
FIG. 2 illustrates a diagram of the configuration of an electronic device according to an embodiment of the present disclosure.

FIG. 2 illustrates a diagram of the configuration of an electronic device according to an embodiment of the present disclosure.

The electronic device 100 may include a display unit 110, a touch sensor 120, a storage unit 130, a radio communication unit 140, and a control unit 150. The display unit 110 and the touch sensor 120 may be formed on the same screen.

First, the display unit 110 may be formed by a Liquid Crystal Display (LCD), an Organic Light Emitting Diodes (OLED), or an Active Matrix Light Emitting Diodes (AMOLED). Further, the display unit 110 visually provides various kinds of information, such as an image, text, and moving image that are executed on the electronic device. The display unit 110 according to an embodiment of the present disclosure may display an execution screen of a web page or an application under the control of the control unit 150, and may display an advertisement banner in the web page or the application.

The touch sensor 120 is a device for sensing a user's touch input. The touch sensor 120 may be of a capacitive overlay type, a resistive overlay type, an infrared beam type, or an electromagnetic induction type. In addition to the above-described types, all kinds of types that can sense a contact of an object or pressure may be used as the touch sensor 120. The touch sensor 120 may sense whether a user's touch is input and the position of a point where the touch occurs and transfer corresponding information to the control unit 150. As the touch sensor 120 according to an embodiment of the present disclosure, both the capacitive overlay type that senses the occurrence of a touch event using a part of a body, such as a finger, and the electromagnetic induction type that senses the occurrence of a touch event using a specific touch pen may be used together. Accordingly, the touch sensor 120 can discriminate respective signals for touches using the finger and the touch pen 300 to transfer the discriminated signals to the control unit 150.

The storage unit 130 serves to store programs and data that are necessary for the operation of the electronic device. The storage unit 130 according to an embodiment of the present disclosure may store data for performing functions that are discriminated with respect to the touch using the body such as the finger and the touch occurring using the touch pen 300.

The radio communication unit 140 may perform radio communication of the electronic device. The radio communication unit 140 performs voice communication, video communication, or data communication with an external device through a network under the control of the control unit 160. The radio communication unit 140 includes a radio frequency transmission unit that performs up-conversion of a frequency of a transmitted signal and amplifies the up-converted frequency, and a radio frequency reception unit that perform low-noise amplification and down-conversion of the frequency of the received signal. The radio communication unit 140 according to an embodiment of the present disclosure may support the electronic device 100 such that the electronic device 100 can perform communication with the external server 200. The radio communication unit 140 may transmit a request signal to the server 200 such that the electronic device according to an embodiment of the present disclosure displays a banner based on the touch pen. Further, the radio communication unit 140 may transmit data for the touch pen based banner that is transmitted from the server 200 to display the data on the screen of the electronic device 100. The data that is received by the radio communication unit 140 may include specific data for discriminating whether the banner is a normal type banner or a touch pen based banner.

The control unit 150 controls the whole operation of the electronic device. The control unit 150 according to an embodiment of the present disclosure may analyze and classify a signal for the touch that occurs on the electronic device. For example, the control unit 150 may perform a function of discriminating a touch signal occurring using a touch pen 300 and a touch signal occurring using a finger from each other. Further, if an advertisement banner that is displayed on the screen is selected using the touch pen 300, the control unit 150 according to an embodiment of the present disclosure may request reception of the touch pen based banner from the server 200. Accordingly, the control unit 150 may display the touch pen based banner that the radio communication unit 140 receives from the server 200. If the touch pen 300 is separated from the main body of the electronic device 100, the control unit 150 according to another embodiment of the present disclosure may operate to set a touch pen use mode, to receive data corresponding to the touch pen based banner that is displayed on the electronic device 100 from the server 200, and to display the touch pen based banner. If the touch pen based banner is touched by the touch pen 300, the control unit 150 may perform an advertisement method using the touch pen 300.

Figure 3:
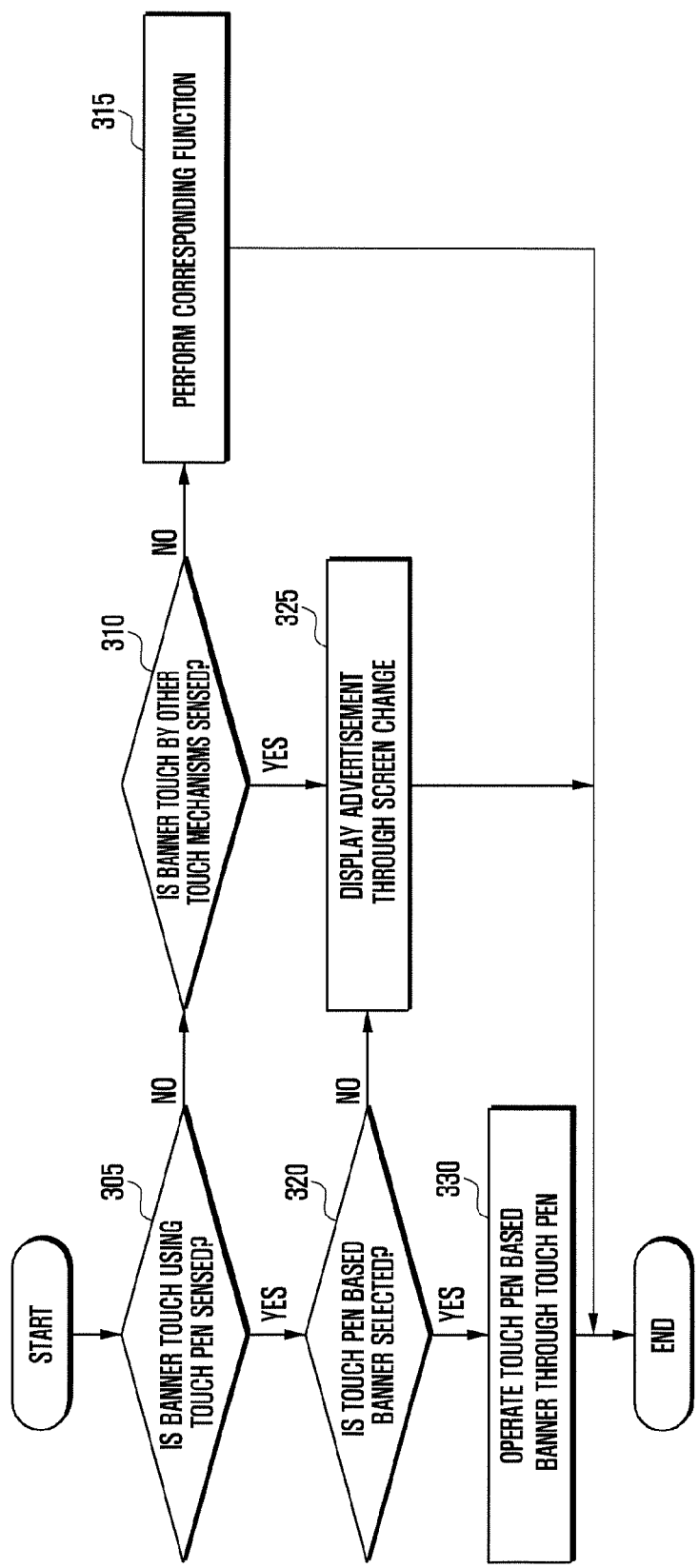
FIG. 3 illustrates a diagram of a method for providing advertisement based on a touch pen according to an embodiment of the present disclosure.

FIG. 3 illustrates a diagram of a method for providing advertisement based on a touch pen according to an embodiment of the present disclosure.

First, at operation 305, the control unit 150 may confirm whether a banner is touched using the touch pen 300. The control unit 150 may discriminate a touch signal occurring using the touch pen 300 and a touch signal occurring using a body, such as a finger, from each other. For example, if the touch by the touch pen 300 and the touch by the finger occur, respectively touch generation signals may be transferred from the touch sensor 120 to the control unit 150 through discriminated transfer paths. In this manner, the control unit can discriminate the touch using the touch pen 300. If it is determined that the touch is not the touch using the touch pen 300 at operation 305, the control unit 305 may confirm whether the banner is touched using other touch mechanisms at operation 310. The other touch mechanisms mean touchable subjects except for the touch pen 300, and for example, an element, such as a finger, may be included therein. If the banner touch by the other touch mechanism is sensed, the control unit 150 may display an advertisement that corresponds to the banner through changing of the screen at operation 325. This is the same as the operation that is performed when the banner that is displayed when the Internet or an application is executed on the existing screen is selected. If the banner touch by the other touch mechanism is not sensed at operation 310, the control unit 150 performs corresponding function at operation 315. For example, at operation 316, the control unit 150 may sense a region except for the banner and change the screen to the corresponding screen.

Alternatively, if it is sensed that the banner is touched using the touch pen 300 at operation 305, the control unit 150 may confirm whether the touch pen based banner is selected at operation 320. The touch pen based banner means a banner through which a touch pen based screen is separately provided by a banner producer. If the touch pen based banner is not selected, the control unit 150 may display the advertisement through the screen change at operation 325. In other words, the control unit 150 may perform a normal banner confirmation operation at operation 325. By contrast, if the touch pen based banner is selected by the touch pen 300, the control unit 150 may control the touch pen based banner to perform the operation by the touch pen at operation 330. Thereafter, the process of FIG. 3 may be ended.

The operation 330 in FIG. 3 according to various embodiments will be described with reference to FIGS. 4 to 6.

Figure 4:
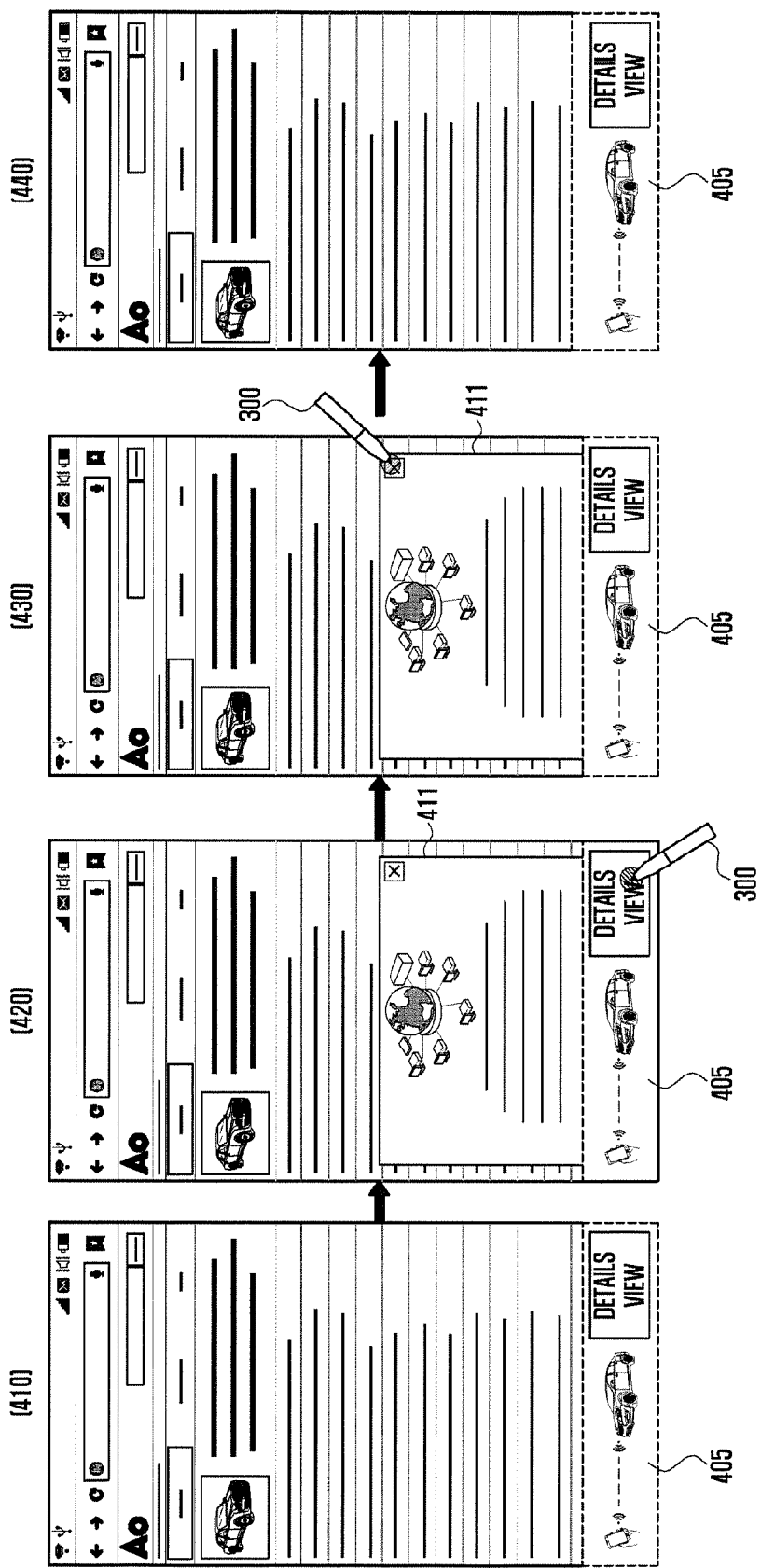
FIG. 4 illustrates a diagram explaining an operation of displaying a preview screen when a touch pen based banner is selected according to an embodiment of the present disclosure.

FIG. 4 illustrates a diagram of an operation of displaying a preview screen when a touch pen based banner is selected according to an embodiment of the present disclosure.

First, screen capture 410 of FIG. 4 illustrates a screen on which the Internet page that includes an advertisement is displayed. As illustrated, a banner 405 for advertisement may be displayed on the lower end of the Internet page. As described above, the banner 405 may be produced such that if the banner 405 is selected by a touch mechanism except for the touch pen 300, such as a finger, in the same manner as the existing method, the page is changed to a linked page to display the contents of the advertisement. In contrast, if the banner 405 is selected by the touch pen 300, the advertisement may be displayed on the preview screen of screen capture 410 as shown in screen capture 420. Further, the preview screen of screen capture 410 may include an end button. As illustrated in 430, if the end button is selected on the preview screen of screen capture 410, the preview screen of screen capture 410 may disappear as illustrated in screen capture 440.

Alternatively, as another method for displaying the preview screen of screen capture 410, the control unit 150 may perform display or display release of the preview screen of screen capture 410 in response to whether the touch pen 300 touches the banner 405. The preview screen of screen capture 410 may be generated without the end button. Further, if the banner 405 is touched by the touch pen 300, the control unit 150 may display the preview screen of screen capture 410 on the display unit 110. If the touch by the touch pen 300 is released, the control unit 150 may end the display of the preview screen of screen capture 410 that is displayed on the display unit 110.

Figure 5:
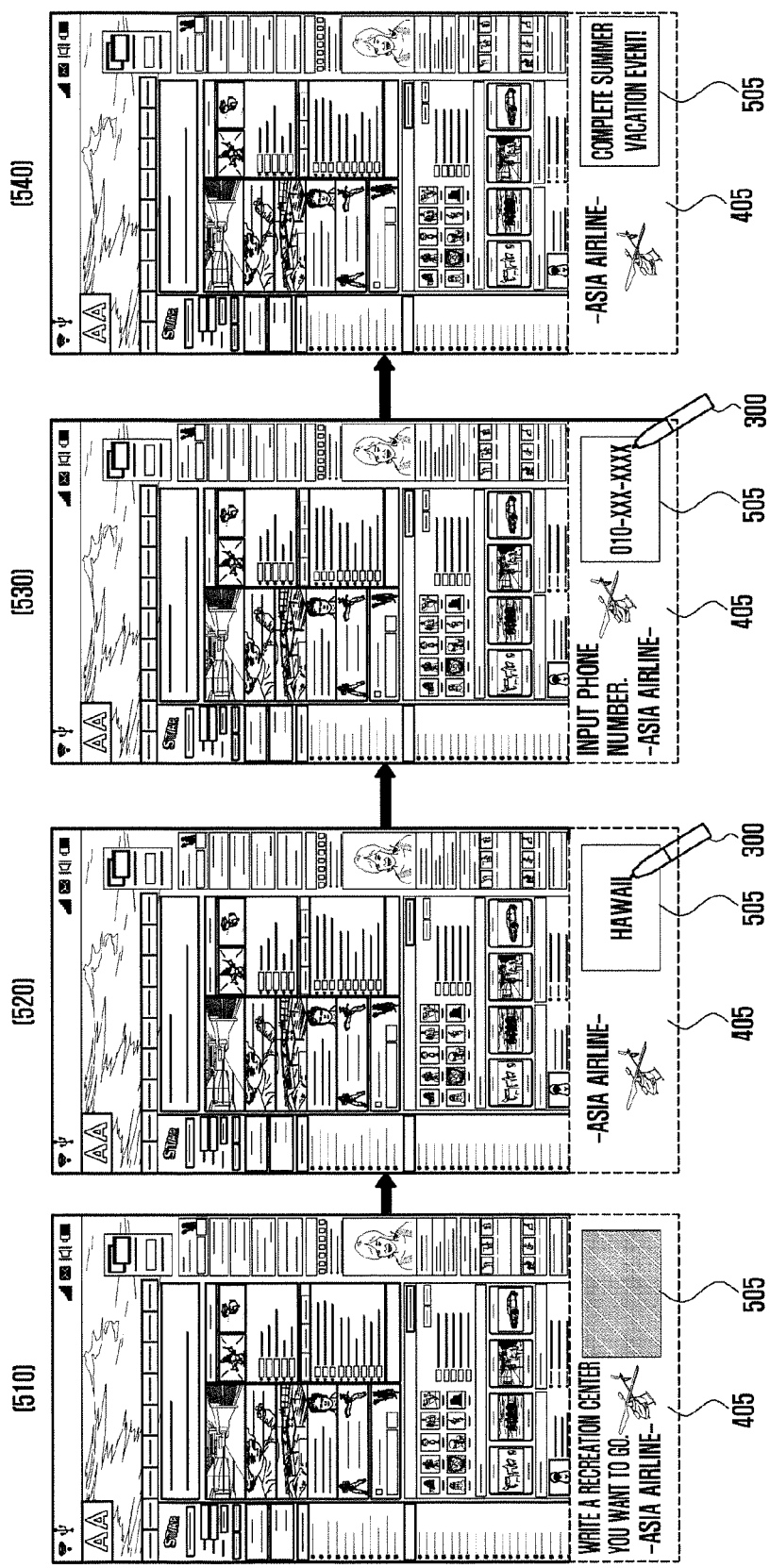
FIG. 5 illustrates a diagram explaining an operation of performing an input using a touch pen on a touch pen based banner according to an embodiment of the present disclosure.

FIG. 5 illustrates a diagram explaining an operation of performing an input using a touch pen on a touch pen based banner according to an embodiment of the present disclosure.

First, screen capture 510 illustrates that the banner 405 that includes an input window 505 is positioned at the lower end of the screen. Further, as illustrated in screen capture 510, a phrase that notifies of the touch pen based banner may be stated. Further, the banner 405 may include the input window 505 on which responses to survey questionnaire or other questions are stated using the touch pen. Screen capture 520 illustrates that handwriting is input on the input window 505 in response to an enquiry using the touch pen 300. As described above, the touch pen based banner can transfer the advertisement to a user on the same banner without the screen change even if a touch occurs on the banner. In addition, even in a situation where there is addition information to be acquired from the user, the touch pen based banner can change and display only the contents of the banner 405 without generation of a new popup window or the screen change. Further, referring to screen capture 530, even in a situation where additional information is used in addition to the information input onto the input window 505 in screen capture 520, a next image may be displayed on the banner 405 that is allocated to a predetermined region at the lower end of the screen without the screen change. As illustrated in screen capture 530, the changed image may include a phrase that uses input of additional information using the touch pen 300. If collection of the information that is used by the touch pen based banner is completed, as illustrated in screen capture 540, an image that notifies of the completion of the information collection process may be displayed on the banner 405. For example, if the information collection is completed, a phrase that notifies of the completion of the information collection process or an entry for an event may be stated on the input window 505.

Figure 6:
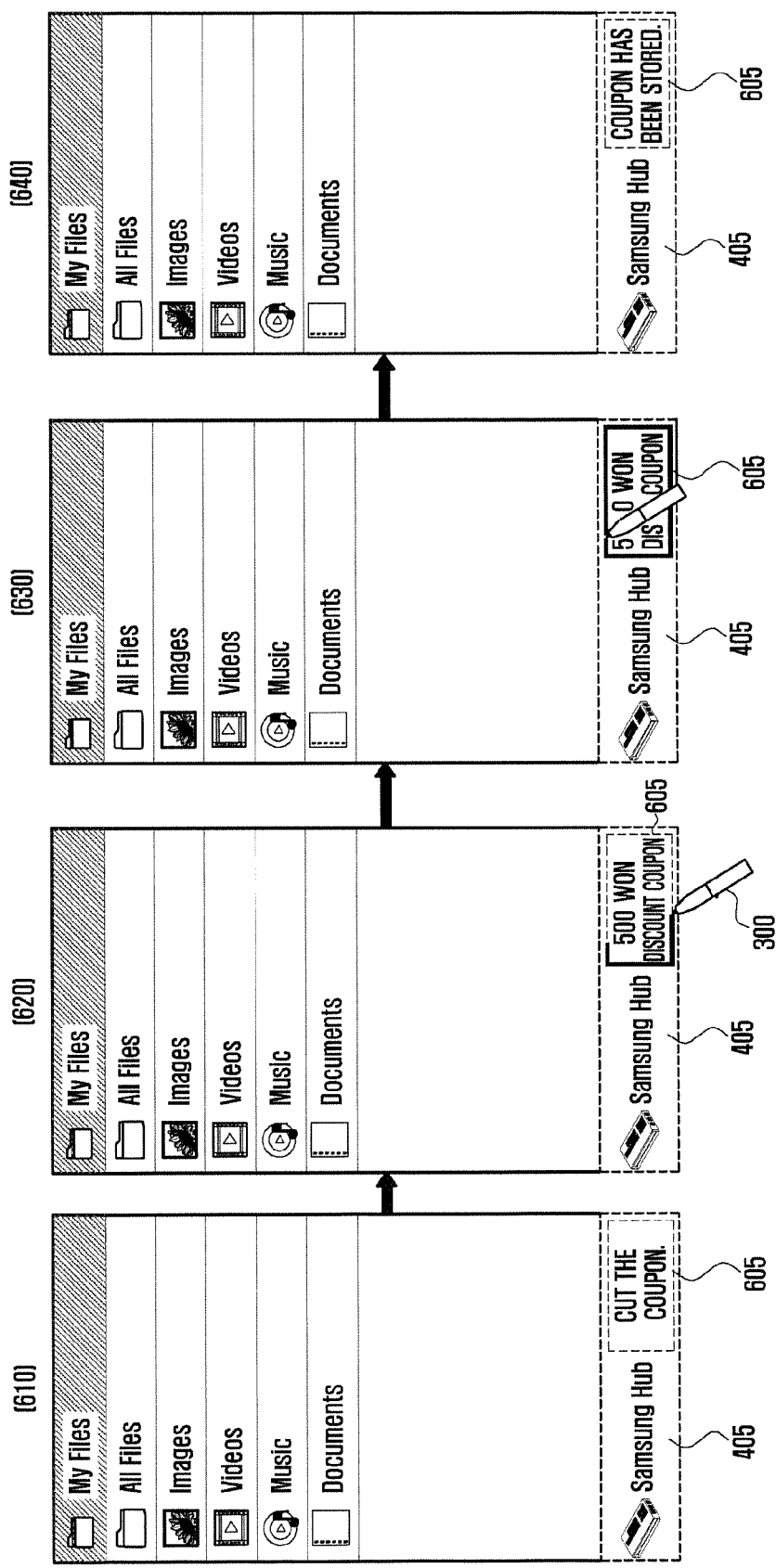
FIG. 6 illustrates a diagram explaining an operation of downloading certain data from a touch pen based banner according to an embodiment of the present disclosure.

FIG. 6 illustrates a diagram explaining an operation of downloading certain data from a touch pen based banner according to an embodiment of the present disclosure.

Screen capture 610 of FIG. 6 illustrates an execution screen of a certain application that includes the banner 405 for advertisement. If a drag operation (operation to move a touch position while maintaining a touch state) is performed along the edge using the touch pen 300, the banner 405 may include data (e.g., coupon) to be stored. Referring to screen capture 610, it can be seen that a coupon image 605 is included in a partial region of the banner 405. Further, the coupon image 605 may be displayed more clearly than the edge so as to facilitate the drag operation of the touch pen 300. Further, the banner 405 may include a phrase that guides a user to perform the drag operation along the edge using the touch pen 300. Further, screen capture 620 illustrates that the drag operation is performed along the edge of the coupon image 605 using the touch pen 300. As illustrated in screen capture 620, if the banner 405 is touched by the touch pen 330 in a state where the touch pen based banner 405 is displayed, only the banner image may be changed without performing the screen change. Screen capture 630 illustrates that the coupon image 605 in the banner 405 is selected through dragging along the edge of the coupon image 605 using the touch pen 300. Referring to screen capture 630, a part of the coupon image 605 may be changed and displayed according to the drag state of the touch pen 300 without the screen change. For example, the display unit 110 may display only the edge of the coupon image 605, along which the drag operation is preformed, with a thick line. If dragging of the edge of the coupon image 605 with the touch pen 300 is completed using such a method, a screen may be displayed as shown in screen capture 640. Screen capture 640 is an image that notifies the user that the coupon is stored in the electronic device through the edge dragging by the touch pen 300.

As described above, the touch pen based banner according to an embodiment of the present disclosure can change the banner image in response to the touch using the touch pen without the screen change, and perform functions of preview image display, information collection, and data download.

Figure 7:
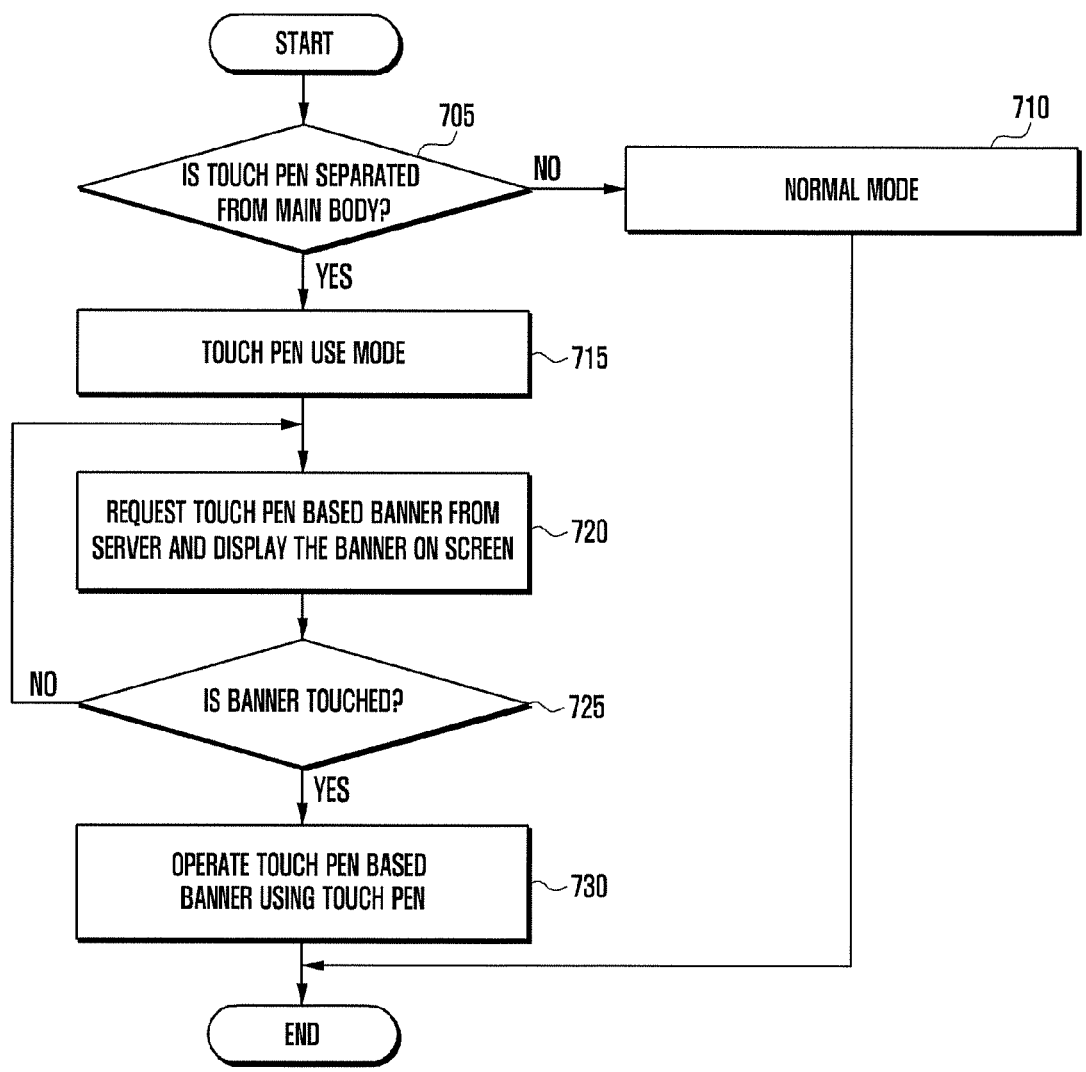
FIG. 7 illustrates a process of a method for providing a touch pen based banner according to another embodiment of the present disclosure.

FIG. 7 illustrates a process of a method for providing a touch pen based banner according to another embodiment of the present disclosure.

First, the control unit 150 of the electronic device 100 according to an embodiment of the present disclosure can confirm whether the touch pen 300 is separated from the main body of the electronic device 100 at operation 705. In the embodiment, the touch pen 300 may be combined with the main body of the electronic device 100. Accordingly, if the touch pen 300 is separated from the main body, the control unit 150 of the electronic device 100 can sense the separated state and perform an operation according to the separation of the touch pen 300. In the embodiment, if the control unit 150 senses the separation of the touch pen 300 from the main body, the control unit may perform a touch pen use mode at operation 715. In contrast, if the touch pen 300 is not separated, the control unit may perform a normal mode at operation 710. The normal mode corresponds to a state where the finger touch and the touch by the touch pen 300 are not discriminated from each other when the banner is touched during the Internet page display or application execution. Accordingly, the control unit 150 does not request the touch pen based banner from the server 300 in the normal mode.

However, if the touch pen use mode is performed and the banner is displayed on the screen at operation 720, the control unit 150 may request the touch pen based banner from the server and display this on the screen. At operation 725, the control unit can confirm whether the banner is touched. The control unit 150 may consider all kinds of touches that are sensed in the touch pen use mode as the touches by the touch pen 300. Accordingly, if the banner is touched in the touch pen use mode, the control unit 150 may support to operate in the same manner as the situation where the touch pen based banner senses the touch pen 300 at operation 730.

Alternatively, the embodiments of the present disclosure as described above may be implemented in the form of program commands that can be performed through various computer means and may be recorded in a computer-readable recording medium. The computer-readable recording medium may include program commands, data files, and data structure solely or in a combination. The program commands recorded in the recording medium may be specially designed and configured for the present disclosure or may be known to computer software providers to be available.

The computer-readable recording medium may include a magnetic medium, such as a hard disk, a floppy disk, or a magnetic tape, an optical medium, such as a Compact Disk Read Only Memory (CD-ROM) or a Digital Versatile Disk (DVD), a magneto-optical medium, such as a floptical disk, or a hardware device that is specially configured to store and perform the program command, such as a Read Only Memory (ROM), a Random Access Memory (RAM), or a flash memory. Further, the program command may include not only a machine code made by a compiler but also a high-level language code that can be executed by a computer using an interpreter. The above-described hardware device may be configured to operate as at least one software module to perform the operation according to the present disclosure, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing an advertisement in an electronic device comprising:

confirming, by a processor of the electronic device, whether an electronic device operates in a touch pen use mode or a normal mode, wherein the touch pen use mode is a mode for detecting a touch event using a touch pen and the normal mode is a mode for detecting a touch event using a user's hand;

controlling, by the processor, a communication module to transmit a signal for requesting a touch pen based banner in response to confirming that the electronic device operates in the touch pen use mode;

receiving, by the communication module, a touch pen based banner from a server;

operating the touch pen based banner in response to detection of a touch on the touch pen based banner by a touch pen, wherein the touch pen based banner is a banner including a screen for receiving a user input using the touch pen;

controlling, by the processor, the communication module to transmit signal for requesting a normal banner in response to confirming that the electronic device operates in the normal mode;

receiving, by the communication module, the normal banner from the server;

switching a first screen including the normal banner to a second screen including the advertisement in response to detection of a touch on the normal banner; and displaying the second screen, wherein the second screen includes an advertisement corresponding to the normal banner.

2. The method of claim 1, wherein the operating the touch pen based banner comprises, when the touch pen based banner supports a preview screen, displaying the advertisement on the preview screen when the touch pen comes in contact with a banner image.

3. The method of claim 1, wherein the operating the touch pen based banner comprises, when the touch pen based banner displays a touch pen dedicated input window on a banner image to collect information, receiving an input of recorded information without a separate screen change when the information is recorded on the input window through the touch pen.

4. The method of claim 1, wherein the operating the touch pen based banner comprises, when the touch pen based banner includes data that can be downloaded, displaying the data on the banner as an image of which an edge can be dragged.

5. The method of claim 4, wherein the operating the touch pen based banner comprises:
  sensing an edge drag using the touch pen in a state where the banner is displayed;
  controlling, by the processor, the communication module to downloading the data in response to completing the edge drag; and
  controlling, by the processor, the display to display notification of completion of the download.

6. The method of claim 1, wherein the operating the touch pen based banner comprises:
  operating the touch pen use mode in response to detecting of detachment of the touch pen from the electronic device; and
  operating the touch pen based banner in response to detection of a touch on the touch pen based banner by the touch pen.

7. An electronic device for providing an advertisement comprising:
  a display;
  a touch sensor configured to sense an occurrence of a touch of a banner through a touch pen or other touch tools;
  a communication module configured to receive data of a touch pen based banner or a normal banner from a server; and
  a processor configured to:
    confirm whether the electronic device operates in a touch use pen mode or a normal mode, wherein the touch pen use mode is a mode for detecting a touch event using a touch pen and the normal mode is a mode for detecting a touch event using a user's hand,
    control the communication module to transmit a signal for requesting a touch pen based banner in response to confirming that the electronic device operates in the touch pen use mode,
    control the communication module to receive a touch pen based banner from a server, and
    operate the touch pen based banner in response to detection of a touch on the touch pen based banner by a touch pen,
    wherein the touch pen based banner is a banner including screen for receiving a user input using the touch pen,
    control the communication module to transmit a signal for requesting a normal banner in response to confirming that the electronic device operates in the normal mode,
    control the communication module to receive the normal banner from the server, and
    control the display to switch a first screen including the normal banner to a second screen including the advertisement in response to detection of a touch on the normal banner.

8. The electronic device of claim 7, wherein, when the touch pen based banner supports a preview screen, the processor is configured to operate to display the advertisement on the preview screen when the touch pen comes in contact with the touch pen based banner.

9. The electronic device of claim 7, wherein, when the touch pen based banner displays a touch pen dedicated input window on a banner image to collect information, the processor is configured to operate to receive an input of recorded information without a separate screen change when the information is recorded on the input window through the touch pen.

10. The electronic device of claim 7, wherein, when the touch pen based banner includes data that can be downloaded, the processor is configured to display an image of the data that can be downloaded such that an edge of the image of the data that can be downloaded can be dragged.

11. The electronic device of claim 10, wherein the processor is configured to sense a drag of an edge of the image using the touch pen, and downloads the data in response to confirming that the drag is completed.

12. The electronic device of claim 7, wherein the processor is configured to:
  operate the touch pen use mode in response to detecting detachment of the touch pen from the electronic device, and
  operate the touch pen based banner in response of detecting a touch on the pen based banner by the touch pen.

13. A non-transitory computer readable medium embodying a computer program, the computer program comprising computer readable program code for:
  confirming, by a processor, whether an electronic device operates in a touch pen use mode or a normal mode, wherein the touch pen use mode is a mode for detecting a touch event using a touch pen and the normal mode is a mode for detecting a touch event using a user's hand;
  controlling, by the processor, a communication module to transmit a signal for requesting a touch pen based banner in response to confirming that the electronic device operates in the touch pen use mode;
  receiving, by the communication module, a touch pen based banner from a server; and
  operating the touch pen based banner in response to detecting a touch on the touch pen based banner by a touch pen,
  wherein the touch pen based banner is a banner including screen for receiving a user input using the touch pen;
  controlling, by the processor, the communication module to transmit a signal for requesting a normal banner in response to confirming that the electronic device operates in the normal mode;
  receiving, by the communication module, the normal banner from the server;
  switching a first screen including the normal banner to a second screen including an advertisement in response to detection of a touch on the normal banner; and
  displaying the second screen, wherein the second screen includes the advertisement corresponding to the normal banner.

14. The non-transitory computer readable medium of claim 13, wherein computer readable program code for the operating the touch pen based banner comprises computer readable program code for, when the touch pen based banner supports a preview screen, displaying the advertisement on the preview screen in response to detecting the touch on the touch pen based banner.

15. The non-transitory computer readable medium of claim 13, wherein computer readable program code for the operating the touch pen based banner comprises computer readable program code for, when the touch pen based banner displays a touch pen dedicated input window on a banner image to collect information, receiving an input of recorded information without a separate screen change when the information is recorded on the input window through the touch pen.

16. The non-transitory computer readable medium of claim 13, wherein computer readable program code for the operating the touch pen based banner comprises computer readable program code for, when the touch pen based banner includes data that can be downloaded, displaying the data on the banner as an image of which an edge can be dragged.

17. The non-transitory computer readable medium of claim 16, wherein computer readable program code for the operating the touch pen based banner comprises computer readable program code for:
   sensing an edge drag using the touch pen in a state where the banner is displayed;
   downloading the data in response to confirming that the edge drag is completed; and
   notifying completion of the download.

* * * * *